(12) United States Patent
Sosnovsky et al.

(10) Patent No.: US 8,418,192 B1
(45) Date of Patent: Apr. 9, 2013

(54) TECHNIQUES USING AN API FOR ASPECT WEAVING

(75) Inventors: Stanislav Sosnovsky, Upton, MA (US); Richard F. Cormier, Franklin, MA (US); Sylvia J. Martin, Shrewsbury, MA (US); Shailendra S. Bist, Shrewsbury, MA (US); Prem K. Singh, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/200,675

(22) Filed: Sep. 28, 2011

(51) Int. Cl.
*G06F 13/00* (2006.01)
(52) U.S. Cl. ...................................................... 719/328
(58) Field of Classification Search ................... 719/328
See application file for complete search history.

(56) References Cited

U.S. PATENT DOCUMENTS

| 7,844,739 B2 * | 11/2010 | Ganesan et al. | 709/246 |
| 7,895,270 B2 * | 2/2011 | Rao et al. | 709/205 |
| 2009/0177735 A1 * | 7/2009 | Algie et al. | 709/203 |

* cited by examiner

*Primary Examiner* — Andy Ho
(74) *Attorney, Agent, or Firm* — Muirhead and Saturnelli, LLC (57) ABSTRACT

Described are techniques for executing an application. The application includes a plurality of partitions including business logic and one or more aspects. A first registration interface of an application programming interface is defined for registering a code entity and associated input and output parameters. A provider of a first aspect of the application is registered using the first registration interface to define the provider as a callback invoked from other code of the application programming interface that performs aspect weaving. The provider includes a first code entity and a first data entity of the first aspect. A second code entity of the business logic is executed that performs a call to the other code performing aspect weaving to obtain a second data entity of the business logic. The other code performing aspect weaving is executed and performs a callback to the provider of the first aspect.

20 Claims, 9 Drawing Sheets

TECHNIQUES USING AN API FOR ASPECT WEAVING

BACKGROUND

1. Technical Field

This application relates to techniques used in connection with aspects and aspect oriented programming (AOP), and in particular, in connection with use of an API (application programming interface) to perform aspect weaving.

2. Description of Related Art

Computer systems may include different resources used by one or more host processors.

Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, an application may be written which embodies multiple abstract concepts whereby the application may be partitioned into different functionally related segments. In some development environments, the application may be written to include code that intermixes or does not separate the different functional segments so that a single routine or code module, for example, may encode logical processing of many different functional segments. The foregoing has drawbacks in that different code developers and maintainers that may each have a different area of expertise related to one of the functional segments cannot independently work on the different functional segments of the application. Furthermore, combining code performing various functionally different segments into a single code entity, such as a single routine or module, does not provide a modular functional design facilitating code reuse of different functional segments.

SUMMARY OF THE INVENTION

In accordance with techniques described herein is a method for executing an application comprising: partitioning said application into a plurality of partitions including business logic and one or more aspects, each of said business logic and one or more aspects including one or more code entities and one or more data entities; defining a first registration interface of an application programming interface for registering a code entity and associated input and output parameters; registering a provider of a first of said one or more aspects using said first registration interface, said registering defining said provider as a callback provider invoked from other code of said application programming interface that performs aspect weaving, said provider including a first code entity and a first data entity of the first aspect of the application; executing a second code entity of the business logic, wherein said executing said second code entity includes performing a call to said other code performing aspect weaving to obtain a second data entity of the business logic; executing said other code performing aspect weaving, wherein said executing said other code includes performing a callback to said provider of the first aspect to obtain the first data entity and using the first data entity to obtain the second data entity; and returning, by said other code performing aspect weaving, said second data entity to the second code entity. The first aspect may include code entities and data entities related to operational logic of the application. The business logic may include code entities and data entities related to business logic of the application, wherein performing processing to complete an operation of said business logic may include performing an operation of said operational logic. The first aspect performing operational logic may include an endpoint provider providing said first data entity, said first data entity being endpoint information used in communicating with a communication endpoint. The endpoint information may include an address of said communication endpoint, a protocol used in communicating with said communication endpoint, and a port used in communicating with said communication endpoint. The endpoint provider may be registered in said registering step as a first endpoint provider using said first registration interface. Executing the other code performing aspect weaving may further include invoking code of said endpoint provider that provides said endpoint information to said other code performing aspect weaving; connecting, by said other code, to said communication endpoint using endpoint information; and obtaining, by said other code, said second data entity. Obtaining the second data entity may include obtaining the second data entity directly from a first system including said communication endpoint. Obtaining the second data entity may further comprise returning a first system data entity that is included in said business logic from a first system that includes the communication endpoint. The method may also include invoking, by said other code, a second endpoint provider of the first aspect, wherein, prior to invocation by said other code, said second endpoint provider is registered as said second endpoint provider using said first registration interface; returning, by said second endpoint provider to said other code, second endpoint information used in communicating with a second communication endpoint; connecting, by said other code, to said second communication endpoint using said second endpoint information; sending, by said other code, said first system data entity to said second communication endpoint; and returning, by a second system including said second communication endpoint, said second data entity. The one or more aspects may include a second aspect performing operational logic and may include a credential provider providing a third data entity of the second aspect. The third data entity may include credentials used to establish an authentication session with said communication endpoint. The credential provider may be registered as a second provider using a second registration interface of the application programming interface defining said second provider as a callback provider invoked from said other code performing aspect weaving. Executing the other code performing aspect weaving may further include invoking code of said credential provider that provides said credentials to said other code performing aspect weaving; and establishing, by said other code, an authentication session with said communication endpoint using said credentials. The second code entity of the business logic may provide a set of one or more input parameters in the call to the other code performing aspect weaving. The set of one or more input parameters may be data entities referenced by the business logic of the application and used in connection with obtaining the second data entity. The set of one or more input parameters may be provided to the communication endpoint as input parameters by said other code.

Also in accordance with techniques herein is a method of executing a client application comprising: partitioning said client application into a plurality of partitions including a business logic partition and one or more other partitions, each of said one or more other partitions corresponding to a different aspect of the client application, wherein said business logic partition and each of said one or more other partitions corresponding to a different aspect includes one or more code entities and one or more data entities, each of said one or more other partitions corresponding to a different operational logic aspect of the client application; providing an application programming interface that performs processing including aspect weaving, said application programming interface including: one or more registration interfaces; and a first code entity having a defined interface including a set of one or more parameters; and executing code of the business logic partition which invokes said first code entity of the application programming interface, wherein said first code entity invokes one or more registered providers of an operational logic aspect of the client application to obtain one or more operational logic data entities used in obtaining one or more business logic data entities. The method may include registering said one or more providers of the operational logic aspect using said one or more registration interfaces of the application programming interface. The registering may include registering a code entity, input parameters, and output parameters of the operational logic aspect. The registering may register any of an endpoint provider providing communication endpoint information, a credential provider providing credentials used to establish an authentication session with a communication endpoint, a crash recovery provider that saves context information used for crash recovery, a transaction provider that saves transactional context information, a failover or high availability provider that provides information regarding connection failures and/or alternative connections to be utilized upon failure of a primary connection, a quality of service provider that indicates what one or more quality of service parameters to use and/or provides values for the quality of service parameters, and a logging provider perform logging of various events or operations performed.

In further accordance with techniques herein is computer readable medium comprising code thereon for use in executing a client application, the computer readable medium comprising code for: defining a plurality of partitions of the client application, the plurality of partitions including a business logic partition and one or more other partitions, each of said one or more other partitions corresponding to a different aspect of the client application, wherein said business logic partition and each of said one or more other partitions corresponding to a different aspect includes one or more code entities and one or more data entities, each of said one or more other partitions corresponding to a different operational logic aspect of the client application; an application programming interface that performs processing including aspect weaving, said application programming interface including: one or more registration interfaces; and a first code entity having a defined interface including a set of one or more parameters, wherein executing code of the business logic partition invokes said first code entity of the application programming interface, wherein said first code entity invokes one or more registered providers of an operational logic aspect of the client application to obtain one or more operational logic data entities used in obtaining one or more business logic data entities. The one or more providers of the operational logic aspect may be registered using said one or more registration interfaces of the application programming interface. Registering each of the one or more providers may include registering a code entity, input parameters, and output parameters of the operational logic aspect. The registering may register any of an endpoint provider providing communication endpoint information, a credential provider providing credentials used to establish an authentication session with a communication endpoint, a crash recovery provider that saves context information used for crash recovery, a transaction provider that saves transactional context information, a failover or high availability provider that provides information regarding connection failures and/or alternative connections to be utilized upon failure of a primary connection, a quality of service provider that indicates what one or more quality of service parameters to use and/or provides values for the quality of service parameters, and a logging provider perform logging of various events or operations performed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
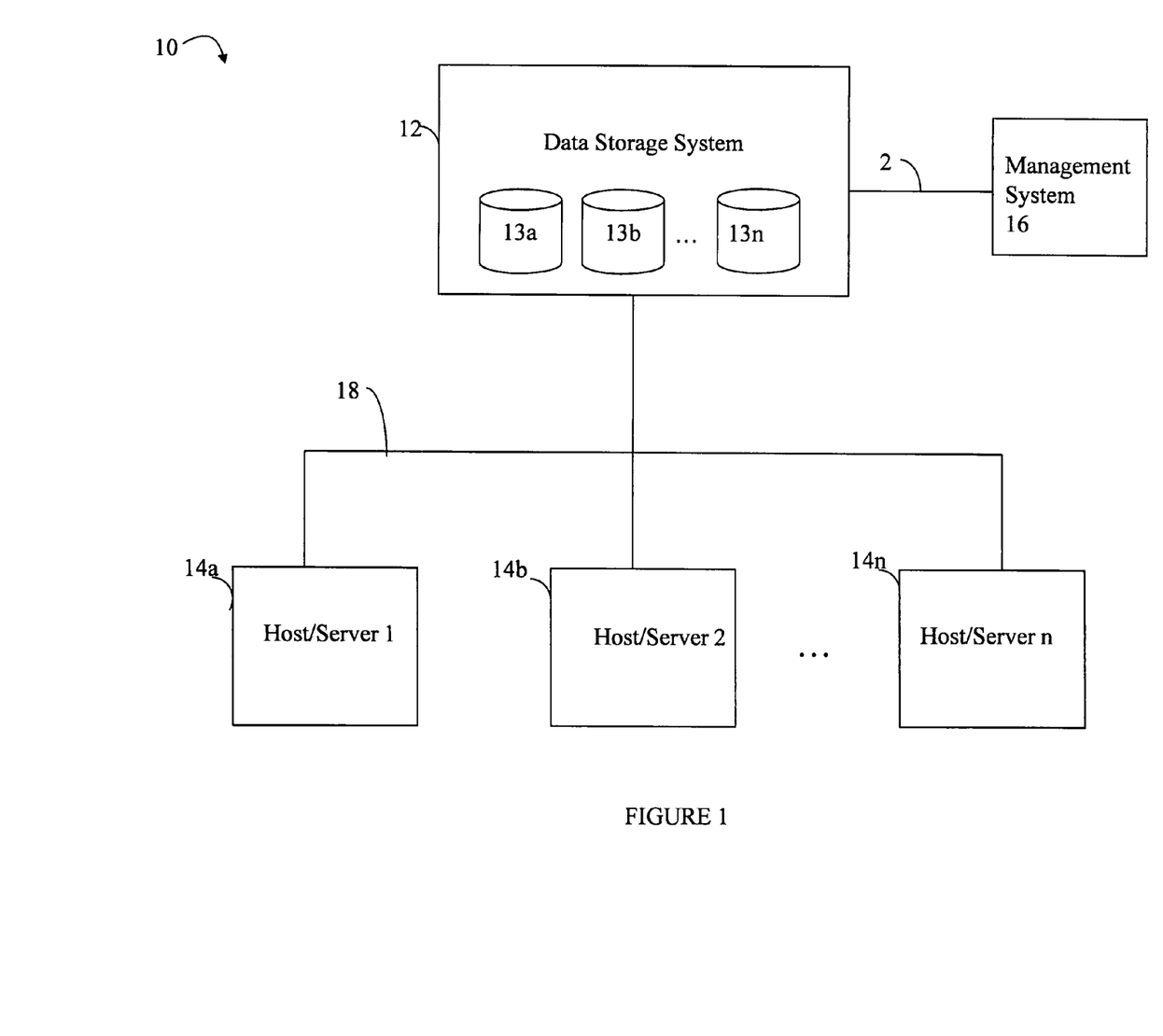
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
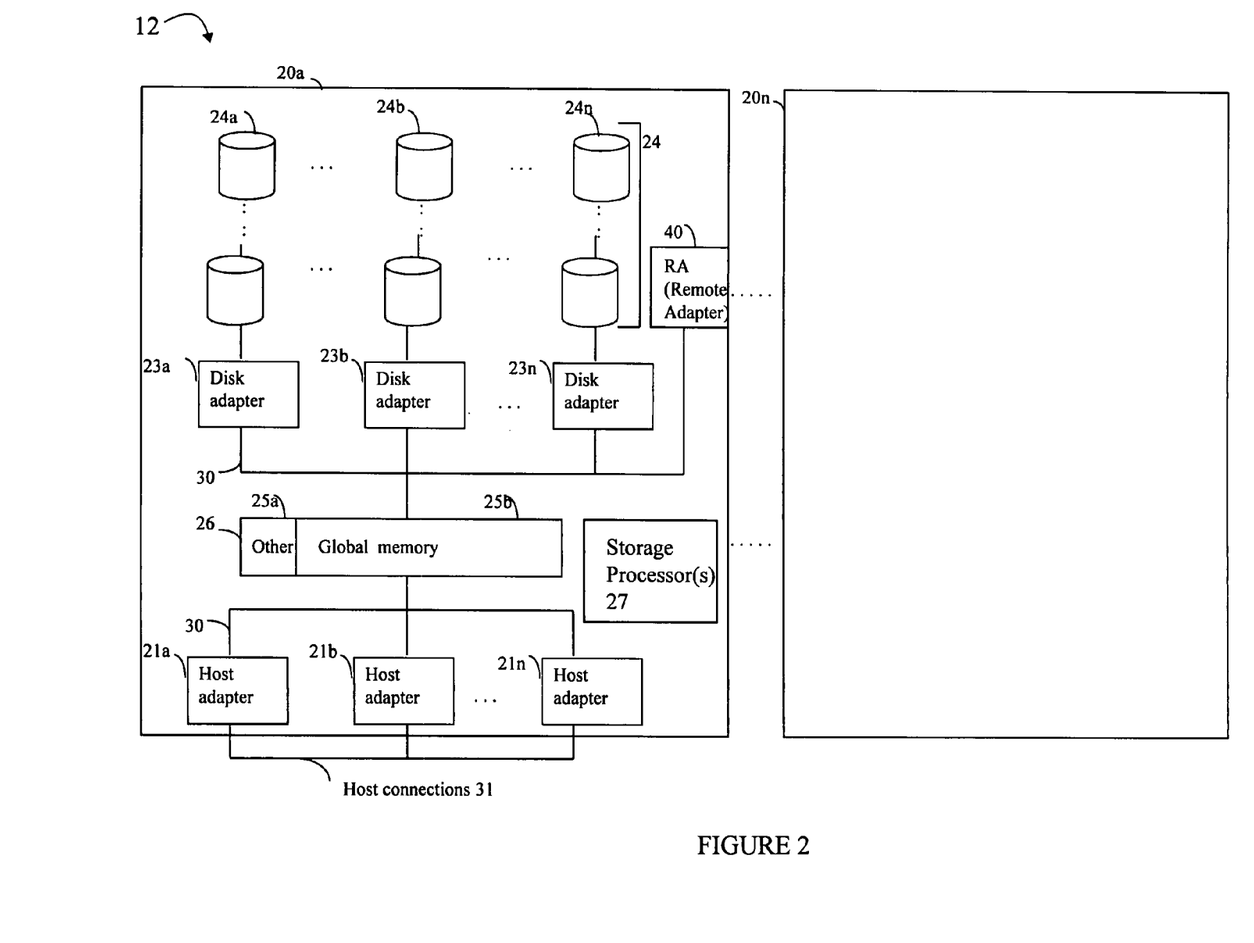
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with a data storage system, system management may be performed using software installed, for example, on a management system 16. The software may be used in connection with techniques herein to display requested data storage management information to a user. For example, the user may be interested in listing information about particular data storage systems, devices, and the like, which may be displayed on a graphical user interface (GUI).

Although following paragraphs may provide exemplary uses of techniques herein with data storage management, it will be appreciated by those skilled in the art that techniques herein have broader use and applicability, more generally, with any type of UI, or even more generally, any application.

Aspect oriented programming may be characterized as a programming paradigm that supports modularization of concerns or aspects. A program or application may be partitioned into distinct segments or partitions where each such segment or partition may correspond to a cohesive area of functionality. The program may perform primary or main operations such as referred to herein as the business logic. An aspect may be characterized as ancillary processing performed as part of accomplishing an operation of the business logic whereby the ancillary processing may cut across multiple business logic operations or tasks. For example, primary tasks performed by the business logic may relate to provisioning storage, performing data replication, data storage system monitoring, and the like. Security is an example of an aspect or concern that may be performed, or applied to, any of the above-noted primary tasks in order to perform such primary task securely in connection with accomplishing the main goal of the primary task. As described elsewhere herein in more detail, the business logic and each of the one or more aspects of an application may include related code entities and data entities. An aspect may be further characterized as an encapsulation of one or more code entities and corresponding data entities of a particular concern whereby the code and data entities of an aspect are a functionally related set of code and associated data for performing an ancillary task that may cut across multiple tasks of the business logic. As an example as described above, a basic or primary functionality of a program may be referred to as the business logic. An aspect of the program may address an operational logic concern or aspect for performing other operations in support of implementation of a task or operation of the business logic. In some embodiments, the operational logic aspect may further comprise multiple different aspects representing a further partitioning of the operational logic concerns. There may be data entities for each individual concern or aspect and also the business logic. For example as described in more detail elsewhere herein, there are data entities of the operational logic aspects such as IP addresses, credentials, and the like, which are not data entities of the business logic. In a similar manner, there are data entities of the business logic which are not data entities of any operational logic. With reference to data storage management as the business logic, an operation or task of the business logic may include retrieving different sets of information of a current data storage configuration for display and presentation to a user via a data storage management GUI. The user may also issue a request for particular data storage management information through the GUI, for example, by selecting a menu item or other interface element. In response, code of the GUI comprising the business logic may issue a request to perform an operation and obtain the requested information using an application programming interface (API) described herein. To further illustrate, a user may request a list of all LUNs on one or more selected data storage systems, may request a list of file systems, may request a list of LUNs upon which data of a particular file system is stored, and the like, by performing an API call. In connection with the obtaining any of the foregoing requested information as a task of the business logic, processing may be performed by the API in accordance with techniques herein to connect to the correct one or more systems (e.g., data storage systems, file servers and the like), obtain and provide any required authentication information that may vary with system, and the like. Additionally, the particular one or more systems from which information may be obtained to provide the user's requested information for display via the GUI may vary with the current data storage system configuration or topology. As such, the runtime or execution sequence performed to implement the business logic operation and obtain requested information may vary with a variety of different factors such as the particular operation and data storage system topology and may be handled by the API code. The runtime execution sequence may include invoking executing code of multiple different aspects of the application which is embodied in encoded logic of the API code as described in more detail below.

Figure 3:
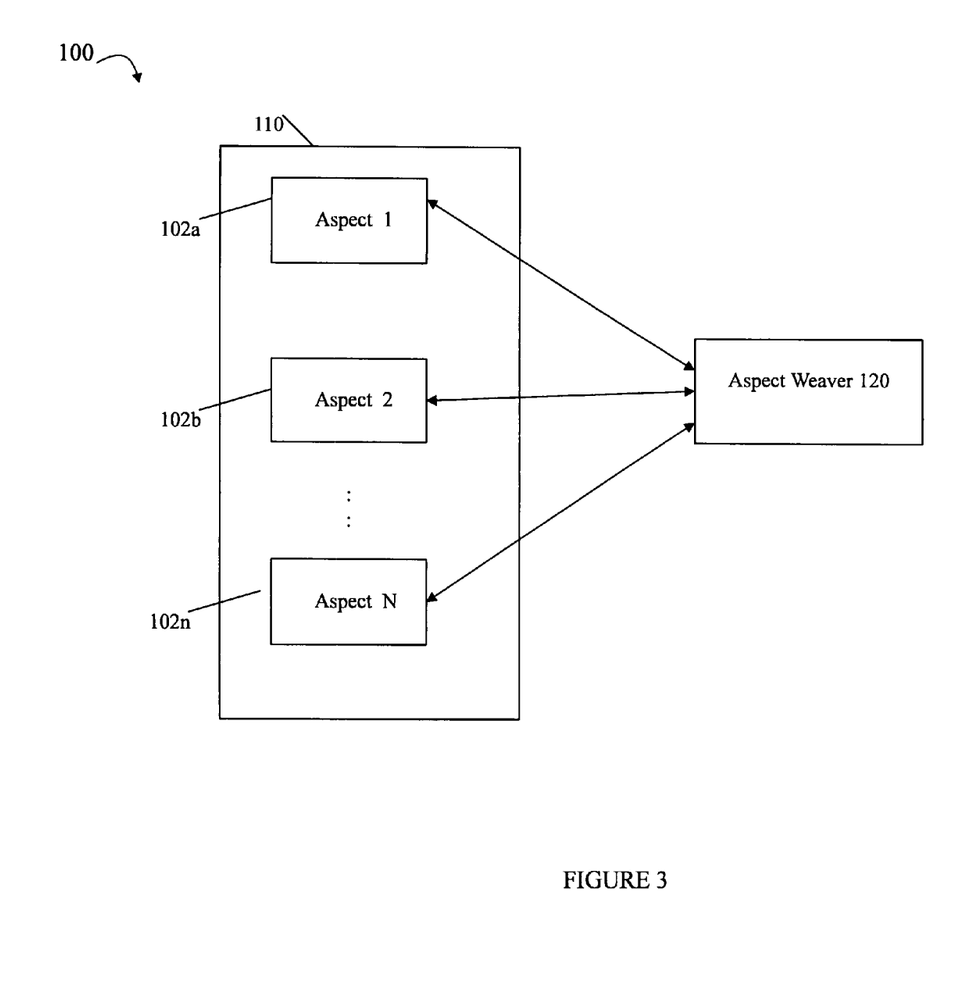
FIG. 3 is an example illustrating different aspects in connection with aspect weaving as may be performed in an embodiment in accordance with techniques herein.

Referring to FIG. 3, shown is an example illustrating use of aspect weaving as may be performed in an embodiment in accordance with techniques herein. The example 100 include an application or process 110 having its code and data partitioned into multiple aspects 102a-102n. The aspect weaver 120 may be characterized as code which executes at runtime and includes programming logic to appropriately invoke various code entities of the different aspects 102a-102n and accordingly use appropriate data entities of such aspects to perform a particular operation or task such as of the business logic.

What will be described in following paragraphs are techniques that may be used in connection with performing aspect weaving using an API in connection with integrating or weaving together code and data of different aspects such as in connection with performing an operation of the business logic. In connection with an application for data storage system management as an exemplary embodiment, the main task or primary operation of the business logic is in performing the different data storage system management operations not in the particular underlying details of the aspects or operational concerns, for example, such as related to security that may vary with data storage system topology and configuration (e.g., whether the requested information for a business logic operation is one or more data storage systems), how to logon or connect to each such system, and the like. In connection with techniques herein, the application may include code and data entities for the business logic and also for each aspect or concern. The application, such as the business logic, may invoke an API that embodies the aspect-weaving logic controlling the sequence or flow of execution related to the different aspects. For example, the API may include code which controls when to obtain sets of credentials, whether to contact multiple systems for performing a single business logic operation, which particular system(s) to contact, and the like. Thus, the application may include aspects having code and data entities where each such aspect may be independently developed. The code of the application (which may also be characterized as a client application or process) does not need to embody the logic of aspect weaving in connection with when to interweave other code and/or data entities from various aspects. Aspects of the application may be interwoven to perform a task through the API. Thus, the application may be insulated from or not exposed to the interweaving of the various aspects to perform a task.

As described in more detail below, the API may define registration interfaces for which aspects of the application may supply code and data via a registration process. Thus, the API may be characterized as supplying hooks into the API framework into which the application code "plugs in" via the registration process. The registration of code entities of the application is completed prior to executing code of the business logic of the application. The registration process involves the application defining and registering callbacks into its own code where the API invokes such callbacks as needed during runtime as part of the aspect weaving process such as when performing processing of a business logic operation. In this example, an operation of the business logic may be implemented by performing an API call where the code of the API embodies the logic and performs processing to weave in code and data of other various aspects. In connection with this aspect weaving process, the API code may perform several callbacks into the application code as needed during runtime as part of aspect weaving. In this manner, the application includes code and data for the different aspects where the API controls when such code of the application's various aspects is invoked, what data entities of the application's aspects are utilized (e.g., which aspect data entities are used as input and/or output parameters for different operational logic tasks), and the like.

In an embodiment described herein, the operational logic may be further partitioned into multiple aspects such as based on different types or categories of services provided. For example, in one embodiment for data storage management the operational logic may include a plurality of types of service providers such as, for example, credential provider(s), endpoint provider(s), logging provider(s), and the like. Each such category of service provider may be characterized as a different aspect and may include one or more providers. An endpoint provider may provide information about a communication endpoint such as of a data storage system, file server, or more generally, any system to which a communication connection is established as part of performing an operation or task for the business logic. For example, as described in more detail in following paragraphs, an example of an endpoint may be a port of a data storage system such as a data storage array or a file server to which a request is issued by API code to obtain information at runtime as part of executing a business logic operation. The endpoint may be identified by a particular IP address, communications protocol and port where all the foregoing may be used in connection with establishing a communication connection to the endpoint. For an endpoint, the communications protocol may identify the particular protocol used when communicating to the identified port of a component having the IP address. A credential provider may provide authentication information or credentials (e.g., account or user id and password) used when establishing an authorized session or connection to a communication endpoint. When establishing a connection to an endpoint, such a connection may or may not require use of authentication information or credentials from a credential provider. A logging provider may perform logging of various events or operations performed. The foregoing are just some examples of the different types of providers that may be included in an embodiment where each such type may be characterized as a different aspect or operational logic concern besides the business logic.

Figure 4:
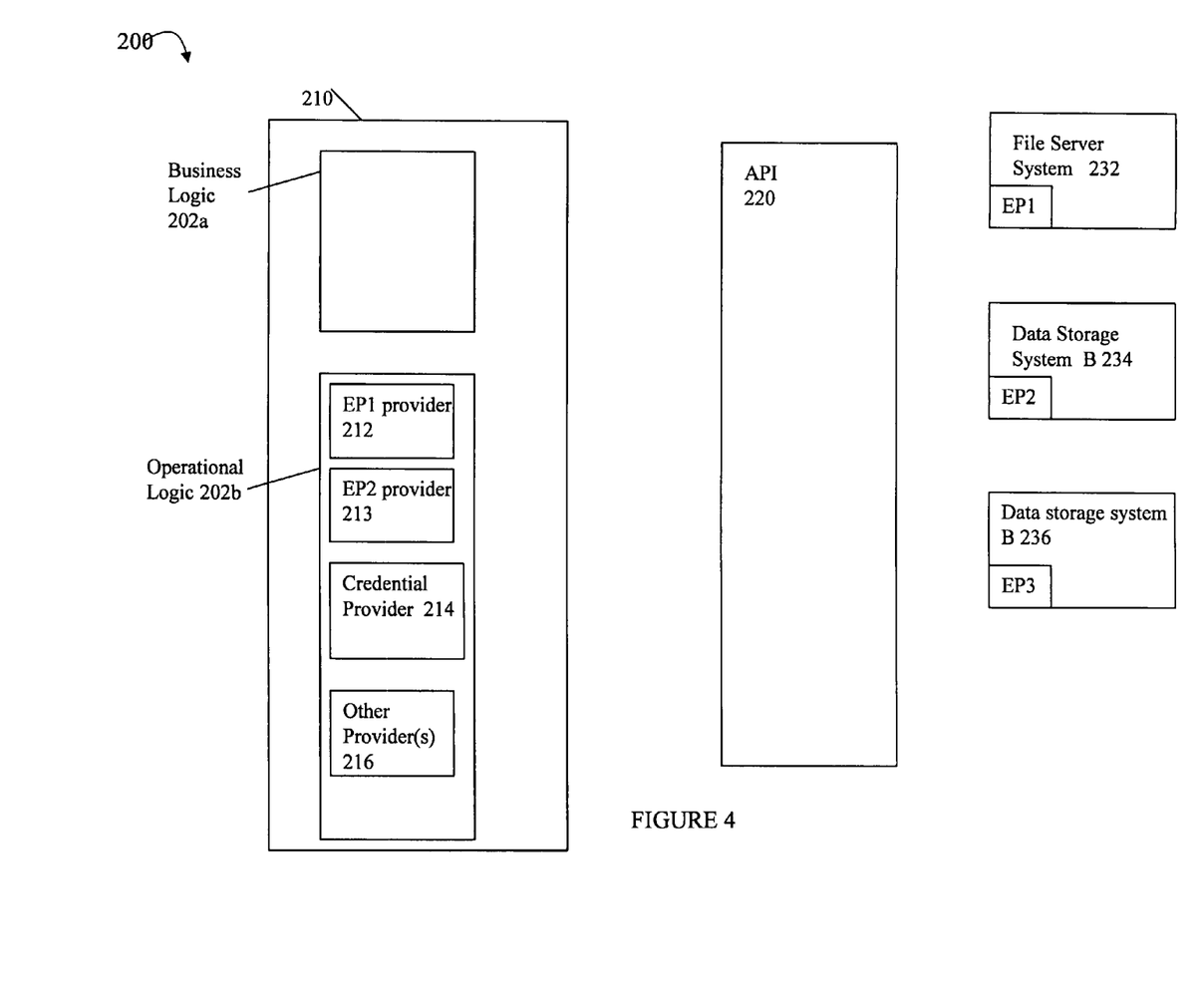
FIG. 4 is an example of components that may be included in an embodiment in accordance with techniques herein.

Each of the foregoing providers of the application may register with the API so that the API may invoke these providers of the application as needed at runtime in connection with performing aspect weaving. Each of the foregoing operational providers include code and data of the application. The API may define the registration interface. The registration interface may identify a registration routine of the API that is invoked by the application provider to register the provider of the application. The API's registration interface may include one or more input parameters identifying the conditions under which the application provider is invoked by API code during execution. For example, as described in more detail below, the API may include a registration interface for registering an endpoint provider of the application. The registration interface may include a parameter that maps to an identifier of the system including an endpoint. The identifier may be a serial number used by the business logic (e.g. the identifier is a data entity of the business logic) and is used to uniquely identify and distinguish among the different systems having endpoints (e.g., uniquely identify each of the different data storage systems, file servers, and the like). In this manner, the API code knows to invoke a particular registered application provider to provide a communication endpoint for a particular system having the serial number. The registration interface may also identify the call signature of the registered application provider such as what input and output parameters, if any, are supplied during runtime invocation. In this manner through registration, the API adds the registered provider to its list of callback routines for possible runtime invocation. In a similar manner, the API may provide additional registration interfaces for registering different aspect providers of the application as may be included in an embodiment in accordance with techniques herein Referring to FIG. 4, shown is an example illustrating an application and API as may be used in an embodiment in accordance with techniques herein for data storage system management. The example 200 includes an application 210 having business logic 202a and operational logic 202b. The example 200 includes an API 220, a file system server 232 and data storage systems 234, 236. The business logic 202b may include a plurality of providers of different types such as, for example, endpoint (EP) providers 212, 213, credential provider 214, and one or more other providers 216. Element 212 may be an EP provider for EP1 of data storage system 232. Element 214 may be an EP provider for EP2 of data storage system 234. Element 214 may be a provider that provides credentials (e.g., user id, password, and the like) used in connection with establishing an authenticated session with any of the EPs. Element 216 may generally represent any other providers that may be included in the application 210. The example 200 may illustrate the components of an embodiment in accordance with techniques herein. As illustrated and described below, one or more of the providers 212, 213, 214 and 216 may register with the API 220 prior to executing code of the business logic 202a in an embodiment in accordance with techniques herein. Such registration with the API 220 provides the application 210 with the means to "plug into" the API 220 so that the API may perform callbacks to the registered providers as needed during execution of API code as part of runtime processing in connection with performing aspect weaving for implementation of a business logic operation.

Various runtime illustrations utilizing components of FIG. 4 will now be described in more detail.

Figure 5:
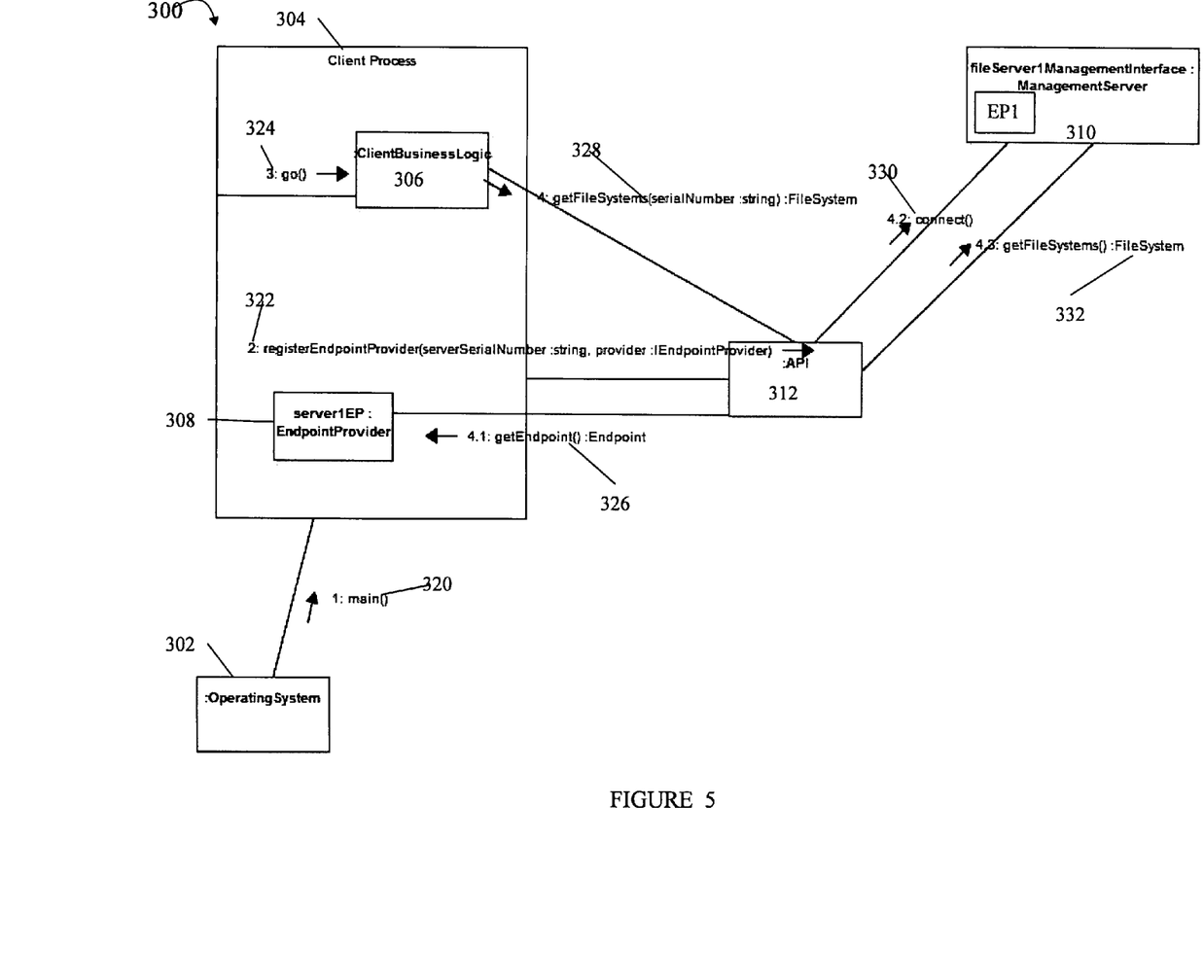
FIGS. 5, 6, 7, and 8 are examples illustrating use of the techniques herein as may be performed in an embodiment.

Referring to FIG. 5, shown is an example illustrating a communication diagram illustrating runtime execution flow in an embodiment in accordance with techniques herein. It should be noted that the example 300 includes only some of the components from FIG. 4 for simplicity of illustration. The example 300 includes application 304 which may be a client process including business logic 306. Elements 304, 306, 308, 312 and 310 of FIG. 5 may be analogous, respectively, to elements 210, 202a, 212, 220, and 232 of FIG. 4. Element 308 may represent code of the application 304 that is the EP1 provider for the file server system EP. Element 310 may be a file server system including EP1. The example 300 illustrates using an EP provider 308 in connection with contacting a file system management server 310 to obtain a list of one or more file systems.

It should be noted that example 300 illustrates a sequence of calls denoted by the connections between different code entities. A call shows the sequence number and call signature as follows: [seq num]: [function name([parameters]): [return type], where each of the "parameters" are input parameters and "return type" identifies the output parameter or type returned by the function at completion of runtime invocation. Also illustrated in connection with sequence number 4 is subnumbering (e.g., 4.1, 4.2 . . . ) which illustrates a runtime call stack. For example call 4, element 328, is accomplished by calling 4.1 (326), then 4.2 (330), and 4.3 (332) and then returning to the caller of 4 (328).

At step 320 the operating system 302 may launch execution of the application 304. At step 322, the application provider 308 providing EP information for EP1 at a later point during runtime may be registered using an endpoint registration interface of the API. In connection with this registration process, the routine registerEndpointProvider of the API is invoked passing as a first input parameter, serverSerialNumber, of type string identifying the serial number of the file server system 310, and a second input parameter, provider, of type EndpointProvider. Element 322 illustrates code entity 308 registering as an EP provider for a server system with a particular serial number passed as a value for the above-mentioned first input parameter. When called at a later point in time by the API (e.g., such as illustrated by 4.1), the registered EP provider 308 returns as an output an EP structure or object of type "Endpoint" including an IP address, port identifier, and protocol.

At step 324, the business logic 306 of the application 304 is notified that provider registration has completed and code of 306 may begin execution. The particular mechanism used to trigger execution of the application's business logic 306 or notify the business logic 306 to start may be performed using any suitable technique that may vary with embodiment. At step 328, the business logic 306 calls 328 code of the API 312 to perform a business logic operation. In this example, the API call 328 returns a parameter of type FileSystem for a corresponding input parameter (e.g., serialNumber of type string) that identifies a file system server. In connection with processing of the API call 328, additional calls denoted by 326, 330 and 332 are performed. The input parameter, serialNumber, for the call 328 is a data entity of the business logic 306. At 326, the API 312 performs a callback to the registered provider 308 to obtain EP information for the desired serial number passed as the first input parameter in 328. The endpoint information for EP1 as returned by 326 (which is a data entity of the EP provider aspect) may include an IP address, protocol and port identifier as described elsewhere herein and the API code 312 may use the foregoing endpoint information for EP1 to connect 330 to fileserver system 310 including EP1. Additionally, once the connection to 310 is established in 330, the API code 312 may call 332 requesting information for the business logic operation. It should be noted that additional query parameters may be provided as input parameters to the call 332 although there are no such query parameters illustrated in this particular example 300. For example, a query parameter provided in the call 332 may be a business logic data entity provided as an input parameter in the call 328. In response to the call 332, the system 310 may return an output to the API 220 of type "FileSystem" identifying one or more managed elements which are data entities of the business logic. Subsequently, the API 312 then returns the managed element(s) of type "FileSystem" to the business logic 306 (e.g., return of call represented by 328). In this example, the managed element(s) returned to 306 as return parameters for call 328 may be a list of one or more file systems.

The example 300 of FIG. 5 provides a rather simple example illustrating use of an API in accordance with techniques herein that performs aspect weaving whereby the API performs a callback to the application by invoking one of the registered client EP providers to obtain endpoint information for desired server serial number. Of note in connection with the foregoing, the API is calling into the other aspects of the application rather than the business logic. The API knows the appropriate logical runtime ordering, sequencing or weaving of aspects (e.g., such as by performing callbacks to the endpoint providers of the operational aspect). The API performs this task rather than the business logic. In this manner, the business logic developer does not need to be burdened with or exposed to the details of the other aspects in order to implement the particular request or operation of the business logic. In a similar manner, the business logic and each of the different aspects of the application 304 may be independently developed without exposing developers of the individual aspects to the complexities of aspect weaving and the other aspects. Rather, in accordance with techniques herein the API weaves together the various aspects in terms of runtime execution sequencing and also selectively using various different data entities of different aspects during runtime.

In this simplified example, it should be noted that there is no authentication required when the API establishes a connection in 330. However, an embodiment may also include other processing performed by the API such as to appropriately invoke other registered client provider callbacks for authentication information if such credentials are required/ authentication is performed in connection with step 330. For example with reference to FIGS. 4 and 5, if authentication information is required for the API 312 to establish a connection via 330 to the management server 310, prior to performing call 330, the API 312 may invoke another previously registered callback provider (such as 214 of FIG. 4) to provide the required authentication information. Subsequently, the API 312 may provide such authentication information as input parameters of the call 330 for establishing an authentication session and connection of 330.

Figure 6:
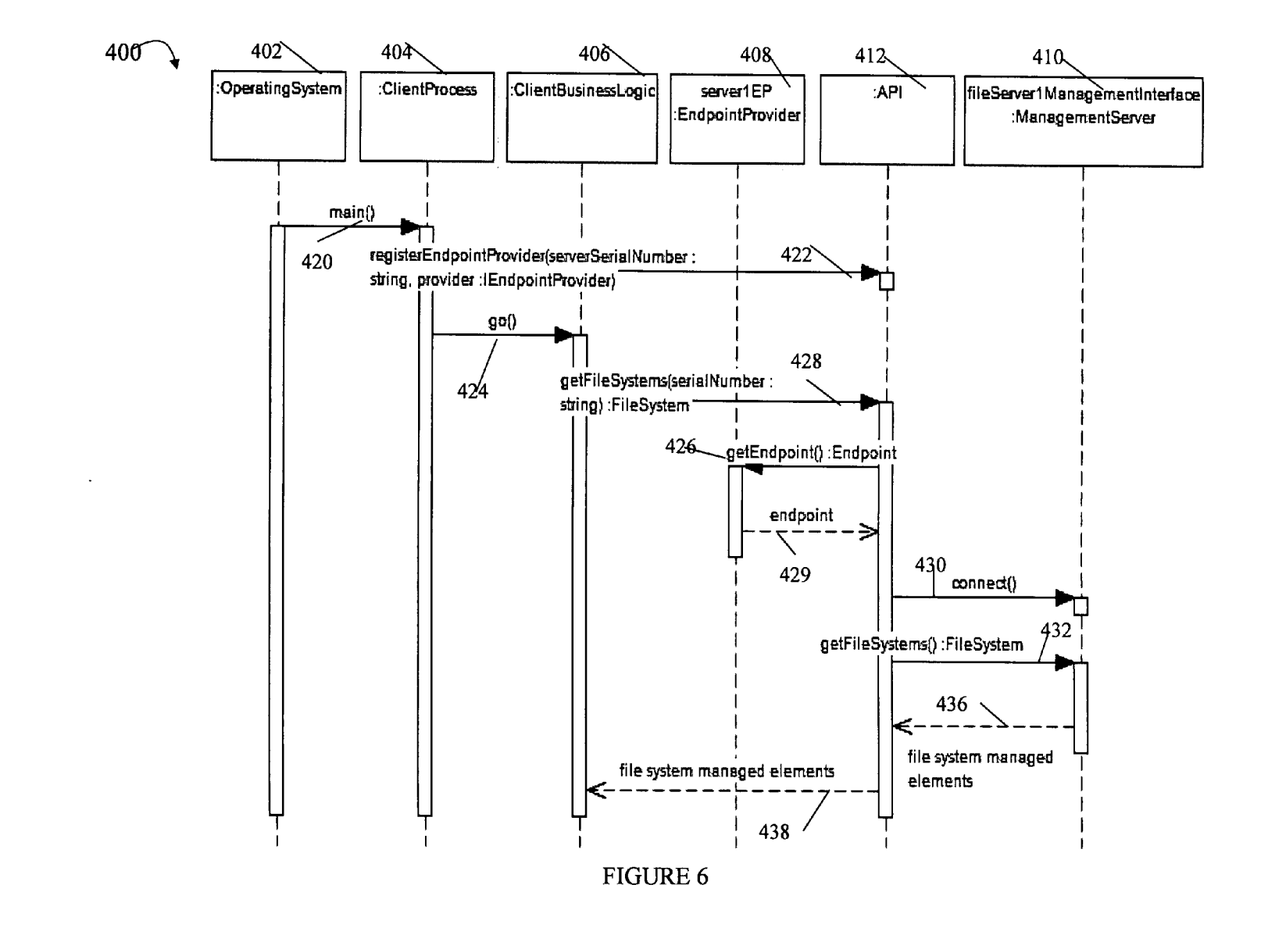

Referring to FIG. 6, shown is a sequence diagram representing the communication diagram and calling sequence of FIG. 5. The example 400 expresses the processing sequence and data flow (e.g., input and output parameters) described above in connection with FIG. 5. In connection with sequence diagram notation, time flows from top to bottom (increasing time towards bottom). Call signatures are denoted as in the sequence diagram and are analogous to those of FIG. 5. Returned data structures are shown with dashed lines. Elements 402, 404, 406, 408, 410, 412, 420, 422, 424, 426, 428, 430, and 432 of FIG. 6 are analogous, respectively, to elements 302, 304, 306, 308, 310, 312, 320, 322, 324, 326, 328, 330 and 332 of FIG. 5. Element 429 illustrates the EP structure of EP information (e.g., including IP address, protocol and port) returned by the registered EP provider 408 of the application. Element 436 illustrates the file system managed elements returned by the management server 310 may include a list of one or more file systems. Element 438 illustrates further returning the foregoing file system managed elements to the application business logic 406.

Figure 7:
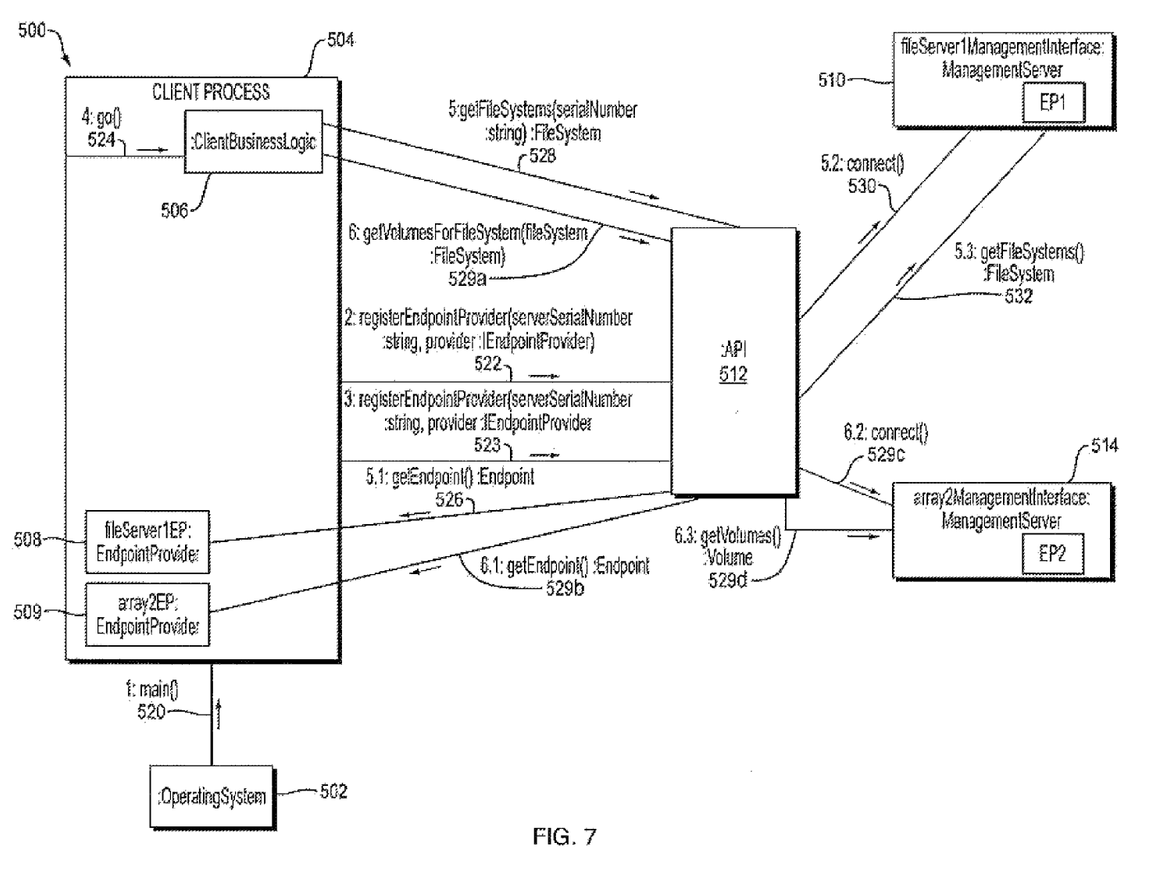

Referring to FIG. 7, shown is another example of a communication diagram illustrating runtime execution flow processing in an embodiment in accordance with techniques herein. It should be noted that the example 500 includes only some of the components from FIG. 4 for simplicity of illustration. Elements 504, 506, 508, 509, 512, 510 and 514 of FIG. 7 may be analogous, respectively, to elements 210, 202a, 212, 213, 220, 232 and 234 of FIG. 4. Element 508 may represent code of the application 504 that is the EP1 registered provider for the file server system EP. Element 510 may be a file server system including EP1. Element 509 may represent code of the application 504 that is the EP2 registered provider for the data storage system or array management server EP. Element 514 may be the data storage system including EP2. As described in more detail below, the example 500 illustrates using an EP provider 508 in connection with contacting a file system management server 310 to obtain a list of one or more file systems as in connection with FIGS. 5 and 6. The example 500 additionally illustrates then requesting information via call 529a about which one or more LUNs a particular file system is stored upon. To obtain the latter information regarding the one or more LUNs for the particular file system, a second EP provider 509 is used to contact a data storage system management server 514. It should be noted that the notations and conventions described above in connection with FIG. 5 also apply to FIG. 7.

At step 520 the operating system 502 may launch execution of the application 504. At step 522, the application provider 508 providing EP information for EP1 at a later point during runtime may be registered using an endpoint registration interface of the API. In connection with this registration process, the routine registerEndpointProvider of the API is invoked passing as a first input parameter, serverSerialNumber, of type string identifying the serial number of the file server system 310, and a second input parameter, provider, of type EndpointProvider. In a manner similar to that of step 522, the application provider 509 providing EP information for EP2 at a later point during runtime may be registered 523 using the endpoint registration interface of the API. Elements 522, 523 illustrate code entities 508, 509 registering as EP providers with a particular serial number passed as a value for the above-mentioned first input parameter. When called at a later point in time by the API (e.g., such as illustrated by 5.1 and 6.1), the registered EP providers 508, 509 each return as an output an EP structure or object of type "Endpoint" including an IP address, port identifier, and protocol.

At step 524, the business logic 506 of the application 504 is notified that provider registration has completed and may begin execution. At step 528, the business logic 506 calls 528 code of the API 312 to perform a first business logic operation. Elements 528, 526, 530, and 532 of FIG. 7 are analogous, respectively, to elements 328, 326, 330 and 332 of FIG. 5. As noted above, the API call 528 returns a parameter of type "FileSystem" for a corresponding input parameter (e.g., serialNumber of type string) that identifies a file system server. The output parameter for call 528 returned to the business logic 506 may be a list of one or more file systems obtained from management server 510.

As a second business logic operation in this example, the application 504 may perform a second query or request by making a second API call 529a, "getVolumesForFileSystem", having an input parameter, "fileSystem", identifying a particular file system. As a return or output parameter, the call 529a returns a list of one or more LUNs providing storage for the particular file system identified in the input parameter of the call 529a. In connection with processing of the API call 529a, additional calls denoted by 529b, 529c and 529d are performed. The input parameter, fileSystem, for the call 529a is a data entity of the business logic 306. At 529a, the API 512 performs a callback 529b to the registered provider 509 to obtain EP information for the desired management system which the API 512 knows is management server 514. The endpoint information for EP2 as returned by 529b (which is a data entity of the EP provider aspect) may include an IP address, protocol and port identifier as described elsewhere herein and the API code 512 may use the foregoing endpoint information for EP2 to connect 529c to management server 514 including EP2. Additionally, once the connection to 514 is established in 529c, the API code 312 may call 529d requesting information (e.g., the LUNs for a particular file system) for the business logic operation. It should be noted that additional query parameters may be provided as input parameters to the call 529d although there are no such query parameters are illustrated in this particular example 500. For example, a query parameter for the call 529d may identify the particular file system originally passed as an input parameter in the call 529a. In response to the call 529d, the system 514 may return (e.g., return of call 529d) an output to the API 220 of type "Volume" identifying one or more managed elements which are data entities of the business logic. In this example, the return parameter of type "Volume" may be a list of one or more LUNs upon which a particular file system is stored. Subsequently, the API 512 then returns the managed element(s) of type "FileSystem" to the business logic 506 (e.g., return of call represented by 529a).

It should be note that any business logic data entities, such as one identifying the particular file system as a query parameter, may be mapped to another suitable form for use when communicating with the various management server systems 510, 514. This mapping may not alter the underlying aspect (e.g., business logic) associated with the data entity.

FIG. 7 provides another example 500 illustrating use of an API in accordance with techniques herein that performs aspect weaving whereby the API performs multiple callbacks to the application by invoking various registered EP providers to obtain desired endpoint information. Additionally, it should be noted that the foregoing example 500 illustrates use of the API performing aspect weaving which hides the physical topology of the management server systems from the business logic 506. In this manner, the business logic 506 is insulated from details of the data storage configuration and topology such as whether management information regarding the file system's provisioned LUNs (e.g., such as in call 529d) are obtained by querying a same management server system or different management server system than when obtaining a list of one or more file systems (e.g., call 532).

As noted above in connection with FIG. 5, no authentication required when the API establishes connections for 530 and 529c in this example. However, an embodiment may also include other processing performed by the API such as to appropriately invoke other registered client provider callbacks for authentication information if such credentials are required.

Figure 8:
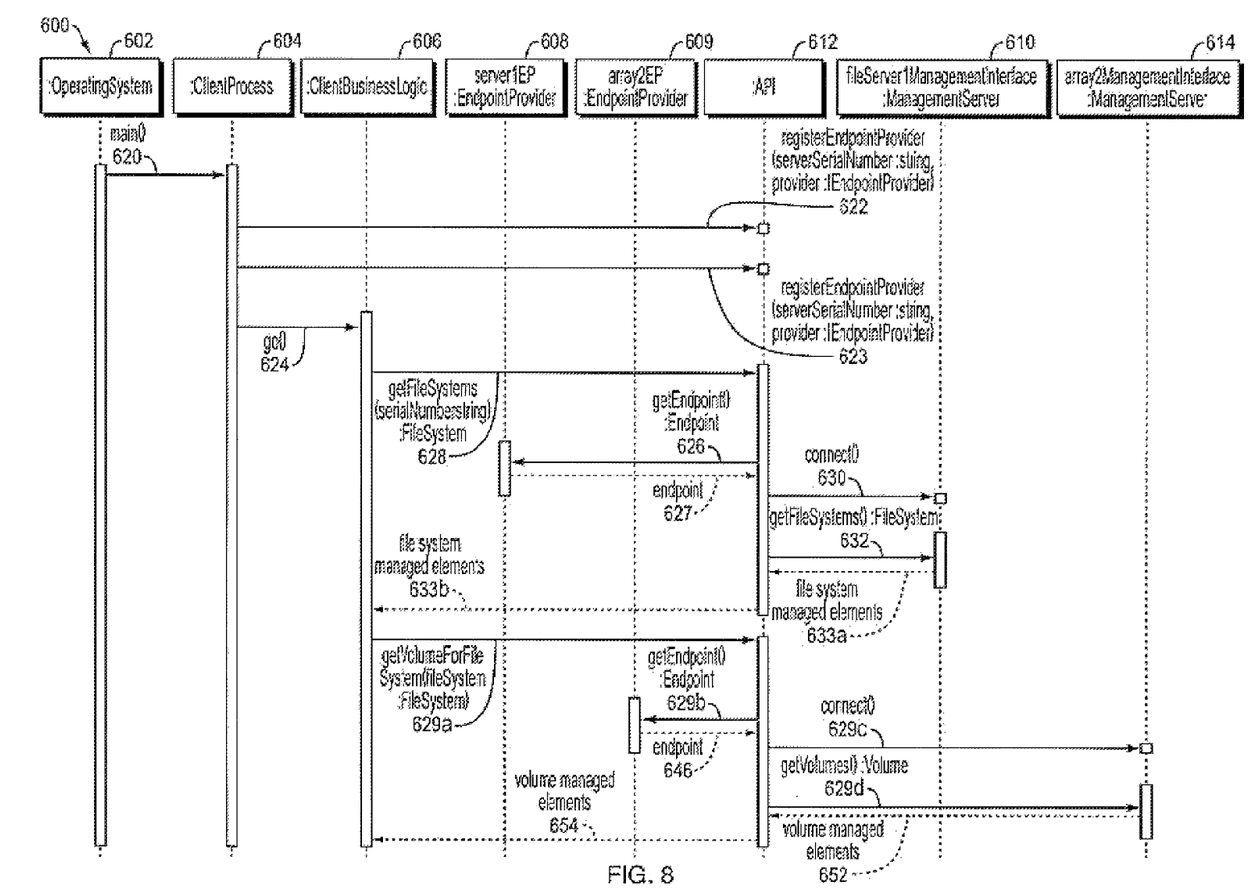

Referring to FIG. 8, shown is a sequence diagram representing the communication diagram and calling sequence of FIG. 7. The example 600 expresses the processing sequence and data flow (e.g., input and output parameters) described above in connection with FIG. 7. In connection with sequence diagram notation, time flows from top to bottom (increasing time towards bottom). Call signatures are denoted as in the sequence diagram and are analogous to those of FIG. 7. Returned data structures are shown with dashed lines. Elements 602, 604, 606, 608, 609, 612, 610, 614 620, 622, 623, 624, 626, 628, 629a, 629b, 629c, 629d, 630, and 632 of FIG. 8 are analogous, respectively, to elements 502, 504, 506, 508, 509, 512, 510, 514 520, 522, 523, 524, 526, 528, 529a, 529b, 529c, 529d, 530, 532 of FIG. 7. Element 627 illustrates the return EP structure of EP information (e.g., including IP address, protocol and port) returned by the registered EP provider 608 of the application. Element 646 illustrates the return EP structure of EP information (e.g., including IP address, protocol and port) returned by the registered EP provider 609 of the application. Element 633a illustrates the file system managed elements returned by the management server 610 such as may include a list of one or more file systems. Element 633b illustrates further returning the foregoing file system managed elements to the application business logic 606. Element 652 illustrates the volume managed elements returned by the management server 614 such as may include a list of LUNs. Element 654 illustrates further returning the foregoing volume managed elements to the application business logic 606.

Figure 9:
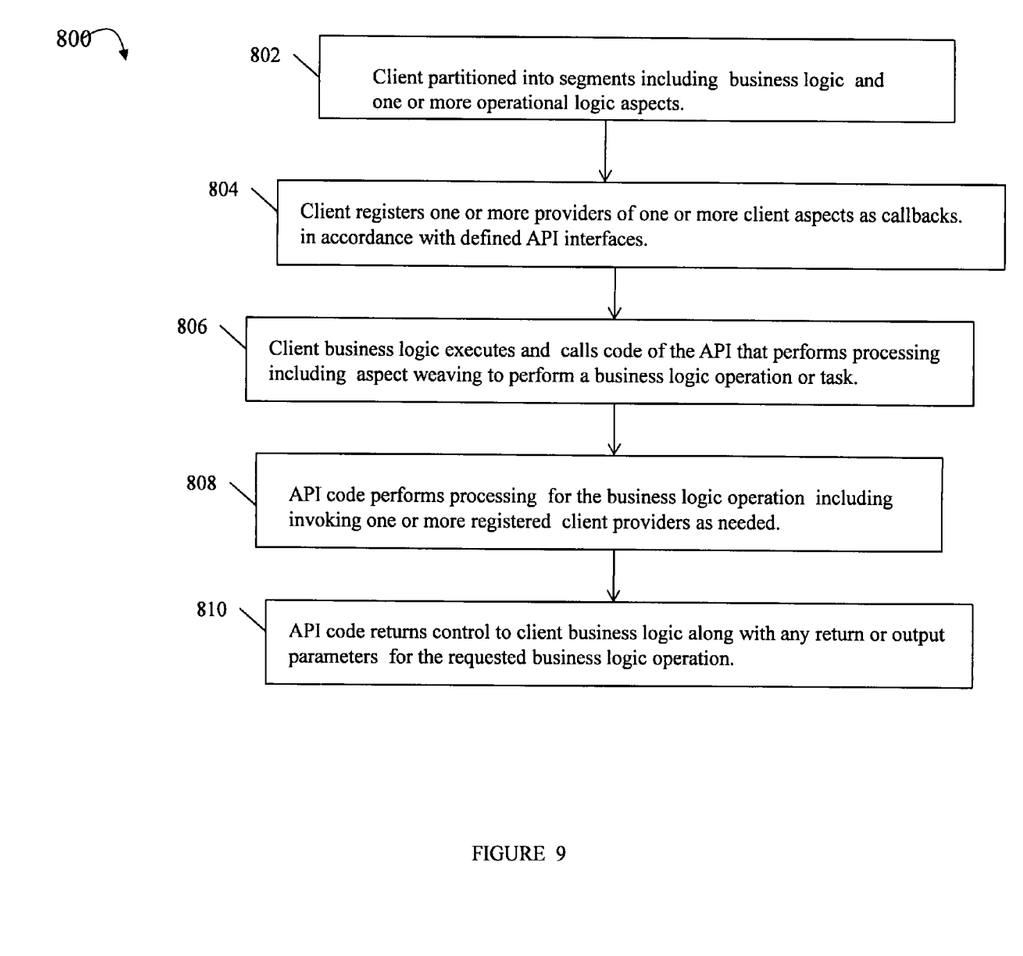
FIG. 9 is a flowchart of processing steps that may be performed in an embodiment in accordance with techniques herein.

Referring to FIG. 9, shown is a flowchart of processing steps as may be performed in an embodiment in accordance with techniques herein. The steps of 800 summarize processing described above. At step 802, the client application may be partitioned into multiple segments including the business logic and one or more operational logic aspects. At step 804, the client application registers one or more providers of one or more of its aspects as callbacks in accordance with defined API interfaces. At step 806, the client application's business logic begins execution and performs a call to API code to perform a business logic task or operation. At step 808, the API code performs processing including aspect weaving as part of performing the business logic task or operation. Step 808 may include the API code invoked one or more registered client application providers as needed as part of the aspect weaving performed. At step 810, the API code returns control to the client application's business logic along with any return or output parameters for the requested business logic operation.

As described above, techniques herein provide for use of an API to perform aspect weaving for different aspects of a client application in connection with implementation of the main or primary tasks of the business logic. The API includes a registration interface used by the client application to register different aspect providers which the API subsequently may invoke, as needed, during runtime of the application. The particular aspects of the data storage management application as the client application using the techniques herein are merely exemplary to illustrate one use of the techniques herein. More generally, an embodiment may include additional and/or different aspects of an application than described herein. For example, the application using the API as described herein may include aspects related to various operational concerns such as providing credentials, endpoint information, performing logging, failover and high availability, obtaining threads as may be needed in connection with processing from a thread factory and for thread management, performing crash recovery, performing transactions, providing and utilizing quality of service parameters, and the like. In connection with failover and high availability, for example, the API may perform processing to use a first endpoint and system. However, if the foregoing first endpoint and/or system are not available, the API may include code which utilizes one or more alternate endpoints and systems and may callback into client code using a registered callback to determine what alternate endpoint(s) and/or system(s) to select, to learn about connection failures, and the like. In connection with crash recovery, the registered callback of the client invoked by the API may save any context information needed for use during recovery processing for a system or application crash. In connection with transactions, the registered callback of the client invoked by the API may save transactional context information. In connection with quality of service, the registered callback of the client invoked by the API may indicate which one or more quality of service parameters to use, (e.g., such as maximum bandwidth), may provide values for such parameters, and the like. As will be appreciated by those of ordinary skill in the art, the application may generally be used for any business logic and is not limited to data storage management as described herein. Use of the techniques herein provides for separation of different aspects of the client application which may be independently developed, maintained and/or tested. Furthermore, use of such independent aspects facilitates reuse of an aspect with other applications.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for executing an application comprising:
providing said application, wherein said application is partitioned into a plurality of partitions including business logic and one or more aspects, each of said business logic and one or more aspects including one or more code entities and one or more data entities;
defining a first registration interface of an application programming interface for registering a code entity and associated input and output parameters;
registering a provider of a first of said one or more aspects using said first registration interface, said registering defining said provider as a callback provider invoked from other code of said application programming interface that performs aspect weaving, said provider including a first code entity and a first data entity of the first aspect of the application;
executing a second code entity of the business logic, wherein said executing said second code entity includes performing a call to said other code performing aspect weaving to obtain a second data entity of the business logic;
executing said other code performing aspect weaving, wherein said executing said other code includes performing a callback to said provider of the first aspect to obtain the first data entity and using the first data entity to obtain the second data entity; and
returning, by said other code performing aspect weaving, said second data entity to the second code entity, wherein said providing, said defining, said registering, said executing a second code entity, said executing said other code and said returning are performed using one or more processors.

2. The method of claim 1, wherein said first aspect includes code entities and data entities related to operational logic of the application.

3. The method of claim 1, wherein said business logic includes code entities and data entities related to business logic of the application, wherein performing processing to complete an operation of said business logic includes performing an operation of said operational logic.

4. The method of claim 3, wherein said first aspect performing operational logic includes an endpoint provider providing said first data entity, said first data entity being endpoint information used in communicating with a communication endpoint.

5. The method of claim 4, wherein said endpoint information includes an address of said communication endpoint, a protocol used in communicating with said communication endpoint, and a port used in communicating with said communication endpoint.

6. The method of claim 5, wherein said endpoint provider is registered in said registering step as a first endpoint provider using said first registration interface, wherein said executing said other code performing aspect weaving further includes:
invoking code of said endpoint provider that provides said endpoint information to said other code performing aspect weaving;
connecting, by said other code, to said communication endpoint using endpoint information; and
obtaining, by said other code, said second data entity.

7. The method of claim 6, wherein said obtaining said second data entity includes obtaining the second data entity directly from a first system including said communication endpoint.

8. The method of claim 6, wherein obtaining said second data entity comprises a first system including said communication endpoint returning a first system data entity that is included in said business logic, and the method further includes:
invoking, by said other code, a second endpoint provider of the first aspect, wherein, prior to invocation by said other code, said second endpoint provider is registered as said second endpoint provider using said first registration interface;
returning, by said second endpoint provider to said other code, second endpoint Information used in communicating with a second communication endpoint;
connecting, by said other code, to said second communication endpoint using said second endpoint information;
sending, by said other code, said first system data entity to said second communication endpoint; and
returning, by a second system including said second communication endpoint, said second data entity.

9. The method of claim 6, wherein said one or more aspects includes a second aspect performing operational logic and includes a credential provider providing a third data entity of the second aspect, said third data entity including credentials used to establish an authentication session with said communication endpoint.

10. The method of claim 9, wherein said credential provider is registered as a second provider using a second registration interface of the application programming interface defining said second provider as a callback provider invoked from said other code performing aspect weaving, wherein said executing said other code performing aspect weaving further includes:
  invoking code of said credential provider that provides said credentials to said other code performing aspect weaving; and
  establishing, by said other code, an authentication session with said communication endpoint using said credentials.

11. The method of claim 6, wherein said second code entity of the business logic provides a set of one or more input parameters in the call to the other code performing aspect weaving, said set of one or more input parameters being data entities referenced by the business logic of the application and used in connection with obtaining said second data entity.

12. The method of claim 11, wherein said set of one or more input parameters are provided to the communication endpoint as input parameters by said other code.

13. A method of executing a client application comprising:
  providing said client application, wherein said client application is partitioned into a plurality of partitions including a business logic partition and one or more other partitions, each of said one or more other partitions corresponding to a different aspect of the client application, wherein said business logic partition and each of said one or more other partitions corresponding to a different aspect includes one or more code entities and one or more data entities, each of said one or more other partitions corresponding to a different operational logic aspect of the client application;
  providing an application programming interface that performs processing including aspect weaving, said application programming interface including:
    one or more registration interfaces; and
    a first code entity having a defined interface including a set of one or more parameters; and
  executing code of the business logic partition which invokes said first code entity of the application programming interface, wherein said first code entity invokes one or more registered providers of an operational logic aspect of the client application to obtain one or more operational logic data entities used in obtaining one or more business logic data entities, wherein said providing said client application, said providing an application programming interface and said executing code of the business logic partition are performed using one or more processors.

14. The method of claim 13, further comprising:
  registering said one or more providers of the operational logic aspect using said one or more registration interfaces of the application programming interface.

15. The method of claim 14, wherein said registering includes registering a code entity, input parameters, and output parameters of the operational logic aspect.

16. The method of claim 15, wherein said registering registers any of an endpoint provider providing communication endpoint information, a credential provider providing credentials used to establish an authentication session with a communication endpoint, a crash recovery provider that saves context information used for crash recovery, a transaction provider that saves transactional context information, a failover or high availability provider that provides information regarding connection failures and/or alternative connections to be utilized upon failure of a primary connection, a quality of service provider that indicates what one or more quality of service parameters to use and/or provides values for the quality of service parameters, and a logging provider perform logging of various events or operations performed.

17. A computer readable storage medium comprising code thereon for use in executing a client application, the computer readable storage medium comprising code for:
  defining a plurality of partitions of the client application, the plurality of partitions including a business logic partition and one or more other partitions, each of said one or more other partitions corresponding to a different aspect of the client application, wherein said business logic partition and each of said one or more other partitions corresponding to a different aspect includes one or more code entities and one or more data entities, each of said one or more other partitions corresponding to a different operational logic aspect of the client application;
  an application programming interface that performs processing including aspect weaving, said application programming interface including:
    one or more registration interfaces; and
    a first code entity having a defined interface including a set of one or more parameters, wherein executing code of the business logic partition invokes said first code entity of the application programming interface, wherein said first code entity invokes one or more registered providers of an operational logic aspect of the client application to obtain one or more operational logic data entities used in obtaining one or more business logic data entities.

18. The computer readable storage medium of claim 17, wherein said one or more providers of the operational logic aspect are registered using said one or more registration interfaces of the application programming interface.

19. The computer readable storage medium of claim 18, wherein registering each of the one or more providers includes registering a code entity, input parameters, and output parameters of the operational logic aspect.

20. The computer readable storage medium of claim 19, wherein said registering registers any of an endpoint provider providing communication endpoint information, a credential provider providing credentials used to establish an authentication session with a communication endpoint, a crash recovery provider that saves context information used for crash recovery, a transaction provider that saves transactional context information, a failover or high availability provider that provides information regarding connection failures and/or alternative connections to be utilized upon failure of a primary connection, a quality of service provider that indicates what one or more quality of service parameters to use and/or provides values for the quality of service parameters, and a logging provider perform logging of various events or operations performed.

* * * * *